Feb. 21, 1961

C. S. RILEY

FILM-VIEWING DEVICE 2,972,279

Filed Oct. 2, 1958

3 Sheets-Sheet 1

INVENTOR.
CHRISTOPHER S. RILEY
BY
Amster & Levy
ATTORNEYS

Feb. 21, 1961 C. S. RILEY 2,972,279

FILM-VIEWING DEVICE

Filed Oct. 2, 1958 3 Sheets-Sheet 2

INVENTOR.
CHRISTOPHER S. RILEY

BY Amster & Levy

ATTORNEYS

Feb. 21, 1961

C. S. RILEY 2,972,279

FILM-VIEWING DEVICE

Filed Oct. 2, 1958

3 Sheets-Sheet 3

INVENTOR.
CHRISTOPHER S. RILEY
BY
Amster & Levy
ATTORNEYS 2,972,279

FILM-VIEWING DEVICE

Christopher S. Riley, R.F.D. 1, Lincoln Park, N.J.

Filed Oct. 2, 1958, Ser. No. 764,794
8 Claims. (Cl. 88—16.2)

The present invention relates generally to a device for viewing films, and in particular to a device adapted for the simultaneous reading and comparing of two sound motion picture films in accordance with the requirements of high-speed film editing.

The editing of motion picture films involves the laborious process of reading through the film to be edited, either alone or simultaneously with another film with which it is to be compared. Thus, the rapidity with which such editing can be accomplished is determined by the speed at which the reading of the film can be conducted. It is highly desirable, therefore, that the film be read at a much greater speed than the normal projection speed. This has raised difficulties, however, in the case of sound motion picture film. Such films have a sound track recorded at a speed corresponding to the normal projection speed and are adapted to be played back or read at that same speed. Consequently, when sound films are read at any speed other than the speed at which the sound track was recorded, the sounds constituting the content of that sound track are reproduced in a garbled and distorted manner which renders them incomprehensible. Thus, conventional films reading devices heretofore available for editing and other purposes can not be used for abnormally rapid reading without sacrificing sound intelligibility.

It is broadly an object of the present invention to solve one or more of the aforesaid difficulties encountered in editing films. This invention provides a novel apparatus and method for reading a sound film or for simultaneously reading and comparing two sound films in accordance with the requirements of editing, and which will enable such reading to be conducted at speeds other than the recording speed of the sound track without thereby rendering the sounds reproduced incomprehensible. It is particularly an object of the invention to allow film editing to be conducted very rapidly without thereby sacrificing sound intelligibility.

In accordance with an illustrative embodiment demonstrating features, objects, and advantages of the apparatus aspects of the present invention, there is provided a device for reading a motion picture film having a sound track recorded at some recording speed. Included in the device are film-reading means operable at a reading speed different from the recording speed of the sound track for displaying images in accordance with the motion picture film and for reproducing sounds in accordance with the sound track thereof, and speed-compensating means for rendering the sounds reproduced comprehensible when the film-reading means is operated at a reading speed different from the recording speed of the sound track.

In accordance with an illustrative method demonstrating features, objects, and advantages of the method aspects of the present invention, there is further provided a method of reading a motion picture film having a sound track recorded at some recording speed. Included in the method are the steps of reading the motion picture film by displaying images in accordance therewith and reproducing sounds in accordance with the sound track thereof at a reading speed different from the recording speed of the sound track and reorganizing the sounds in the course of reproduction thereof to compensate for the difference between the reading speed and the recording speed of the sound track such that the sounds are rendered comprehensible.

Advantageously, with such a device and method, sound films can be read at any desired speed without thereby rendering the sound portion incomprehensible. They can therefore be read at speeds far in excess of the recording speed of the sound track for the purpose of rapid editing, they can be read at the recording speed of the sound track, or they can even be read at a speed less than the recording speed of the sound track if so desired, yet in each case the sounds reproduced will be comprehensible.

The above brief description, as well as further features, objects, and advantages of the present invention, may best be appreciated by reference to the following detailed description of an illustrative embodiment and an illustrative method, when taken in conjunction with the accompanying drawings, wherein.

Referring now specifically to the drawings, a device 10 adapted for simultaneously reading and comparing two motion picture films F and F′ each having a sound track recorded at some recording speed includes a housing 12, a dual rotatable reel assembly operable at a reading speed different from the recording speed of the sound tracks for passing one or for simultaneously passing both of the motion picture films F and F′ operatively through the film reader 10, a dual projection system for displaying images in accordance with one or for simultaneously displaying in juxtaposed relationship images in accordance with both of the motion picture films F and F′, and an audio system for reproducing sounds in accordance with a sound track of either one of the films F and F′.

Figure 1:
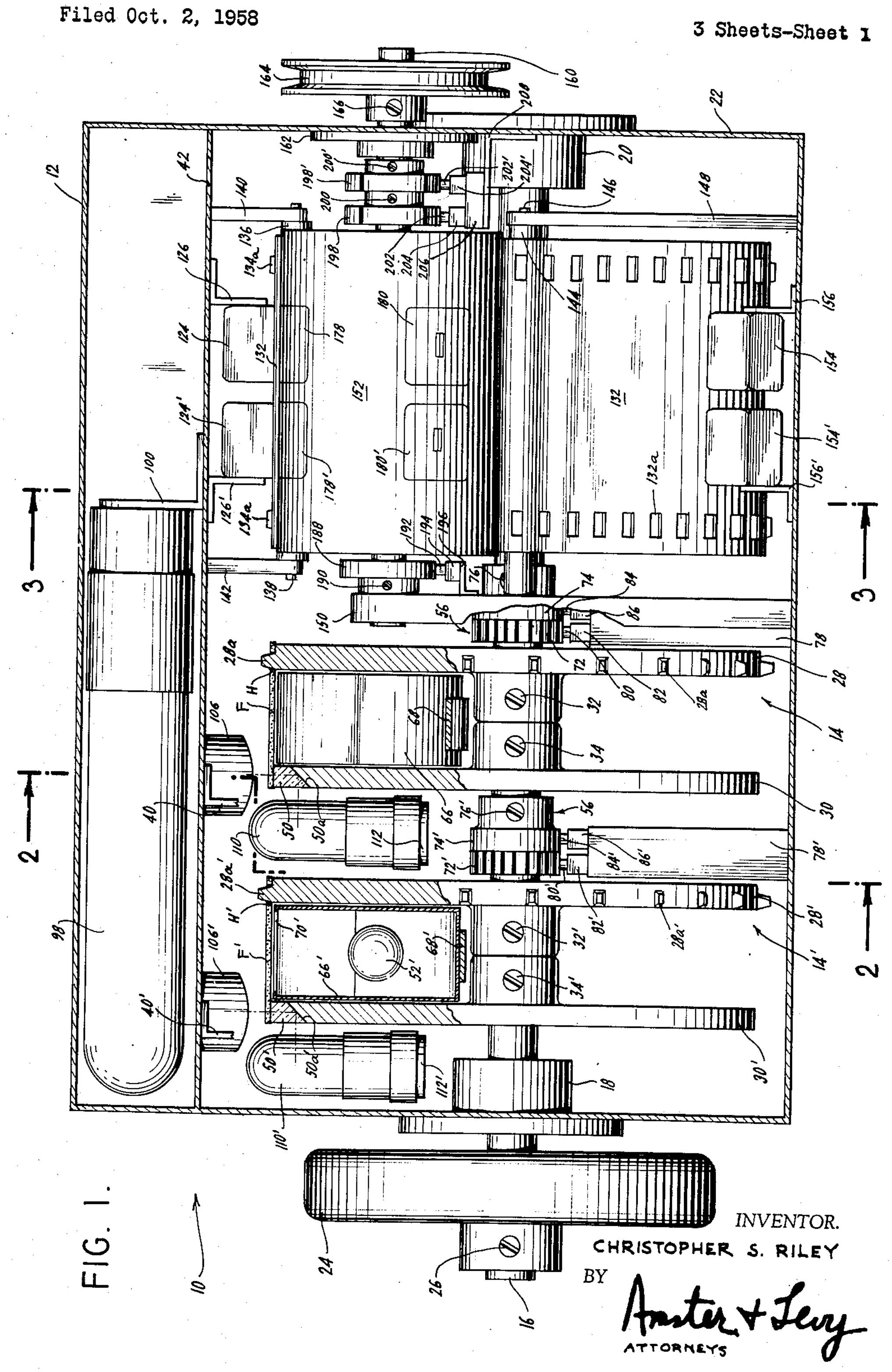
Fig. 1 is a side elevational view, with parts broken away and sectioned, of a portion of a film-viewing device in accordance with the present invention, taken along the lines 1—1 of Fig. 4 looking in the direction of the arrows.
Figure 2:
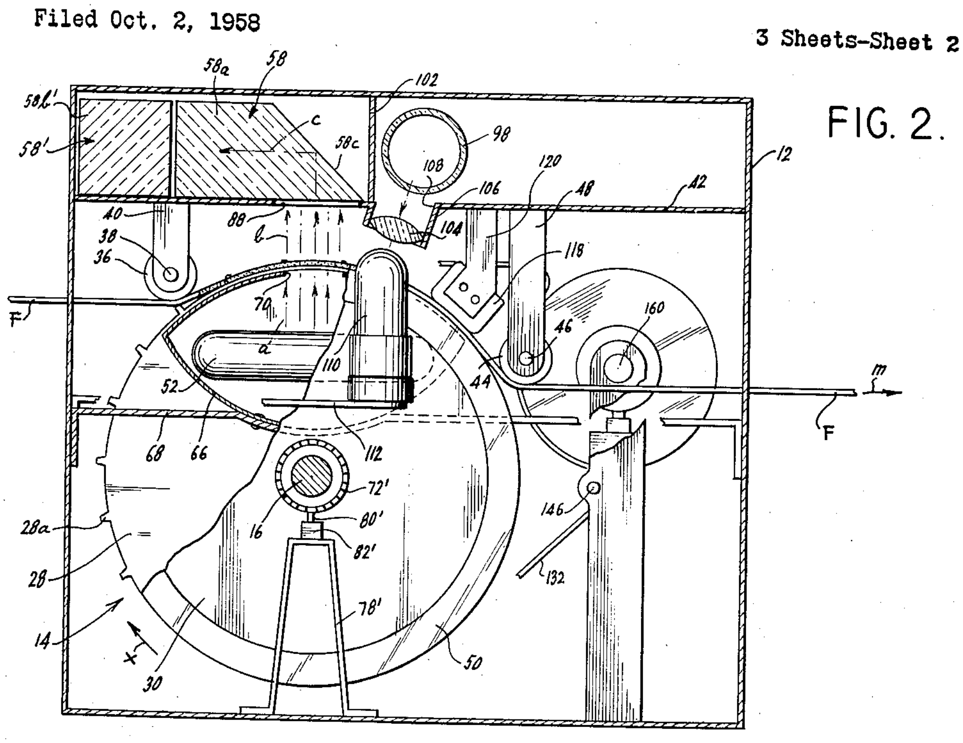
Fig. 2 is a cross-sectional view of the portion of the device of Fig. 1 taken along the lines 2—2 of Figs. 1 and 4 looking in the direction of the arrows.

Referring first primarily to Figs. 1 and 2, it is seen that the dual rotatable assembly includes a pair of reels 14 and 14′ of identical diameter mounted on a main rotatable shaft 16 for passing films F and F′ respectively through the film viewer 10. The shaft 16 is journaled at one end in a flanged bearing 18 mounted on the housing 12 and at the other end in another flanged bearing 20 mounted on an internal partition 22. For smoothing the rotation of the shaft 16 there is provided a flywheel 24 mounted thereon for rotation therewith by a set screw 26. The reels 14 and 14′ consist of halves 28 and 30 and halves 28′ and 30′ rigidly secured to the shaft 16 for rotation therewith by set screws 32 and 34 and set screws 32′ and 34′. Halves 28 and 28′ are provided with sprockets 28a and 28a′ spaced about the rims thereof to cooperate with sprocket holes H and H′ of the films F and F′ such as are commonly provided on the margins of movie films to effect positive engagement of the films F and F′ by reels 14 and 14′. Rollers 36 and 36′ rotatably mounted by means of axle pins 38 and 38′ on brackets 40 and 40′ suspended from an internal partition 42 and disposed at one side of reels 14 and 14′, and rollers 44 and 44′ rotatably mounted by means of axle pins 46 and 46′ on brackets 48 and 48′ suspended from partition 42 and disposed at the other side thereof, are provided to keep the films F and F′ in sprocketed engagement with the reels 14 and 14′. Halves 30 and 30′ are provided with annular Lucite prisms 50 and 50′ at the rims thereof for cooperating as hereinafter described with photographically imprinted sound tracks in the event that either film F or film F′ or both are provided with that type of sound track on the margins thereof adjacent halves 30 and 30′.

The operation of this dual rotatable assembly involves passing films F and F′ through the film reader 10 by stationing on one side thereof a pair of rotatably mounted supply reels (not shown) containing the films F and F′ and on the other side a pair of take-up reels (not shown) rigidly mounted on a common shaft which is rotatably driven by a variable speed motor. The films F and F′ are unwound from the supply reels and then inserted into the film reader 10 through an opening in one side of the housing 12, after which they are in turn threaded under rollers 36 and 36′, reeled over the upper quadrants of reels 14 and 14′, threaded under rollers 44 and 44′, passed out through an opening in the other side of the housing 12 in the direction indicated by the arrow m of Fig. 2, and rewound on the takeup reels. The margins of films F and F′ upon which the sound tracks are imprinted will then overlie the rims of halves 30 and 30′ of reels 14 and 14′ for cooperation thereof with the annular Lucite prisms 50 and 50′ in the event that the sound tracks are photographically imprinted, while at the opposite margins of films F and F′ will be sprocket holes H and H′ thereof for engagement with the sprockets 28a and 28a′ of halves 28 and 28′. The motor provided for the purpose is then made to rotate the take-up reels so as to continuously pull the films F and F′ off the supply reels and through the film reader 10. As the films F and F′ pass over the reels 14 and 14′ the sprocketed engagement therebetween causes the films F and F′ to transmit motion to the reels 14 and 14′, thus causing the latter to rotate, which in turn makes shaft 16 and all the members mounted thereon rotate therewith, in the direction indicated by arrows x of Figs. 2, 3, and 6. The reading speed at which the rotatable assembly is thus made to operate therefore corresponds to the speed at which the films F and F′ are operatively passed through the film reader 10, which in turn depends upon the speed at which the take-up reels are driven. By varying the speed of the take-up reel driver motor, therefore, the reading speed can be selected from a range of available speeds, the driver motor being so chosen that this range extends above and below the recording speed of the sound tracks of films F and F′. When two films F and F′ are simultaneously read and compared, the mounting of the respective take-up reels of films F and F′ on a common shaft insures that they will be passed through the film reader 10 at the same reading speed. Alternatively, if it is not desired to compare the two films F and F′, either one of them may be viewed alone by means of film reader 10 by passing it therethrough in the same manner described and omitting the other.

Figures 4, 5, 6:
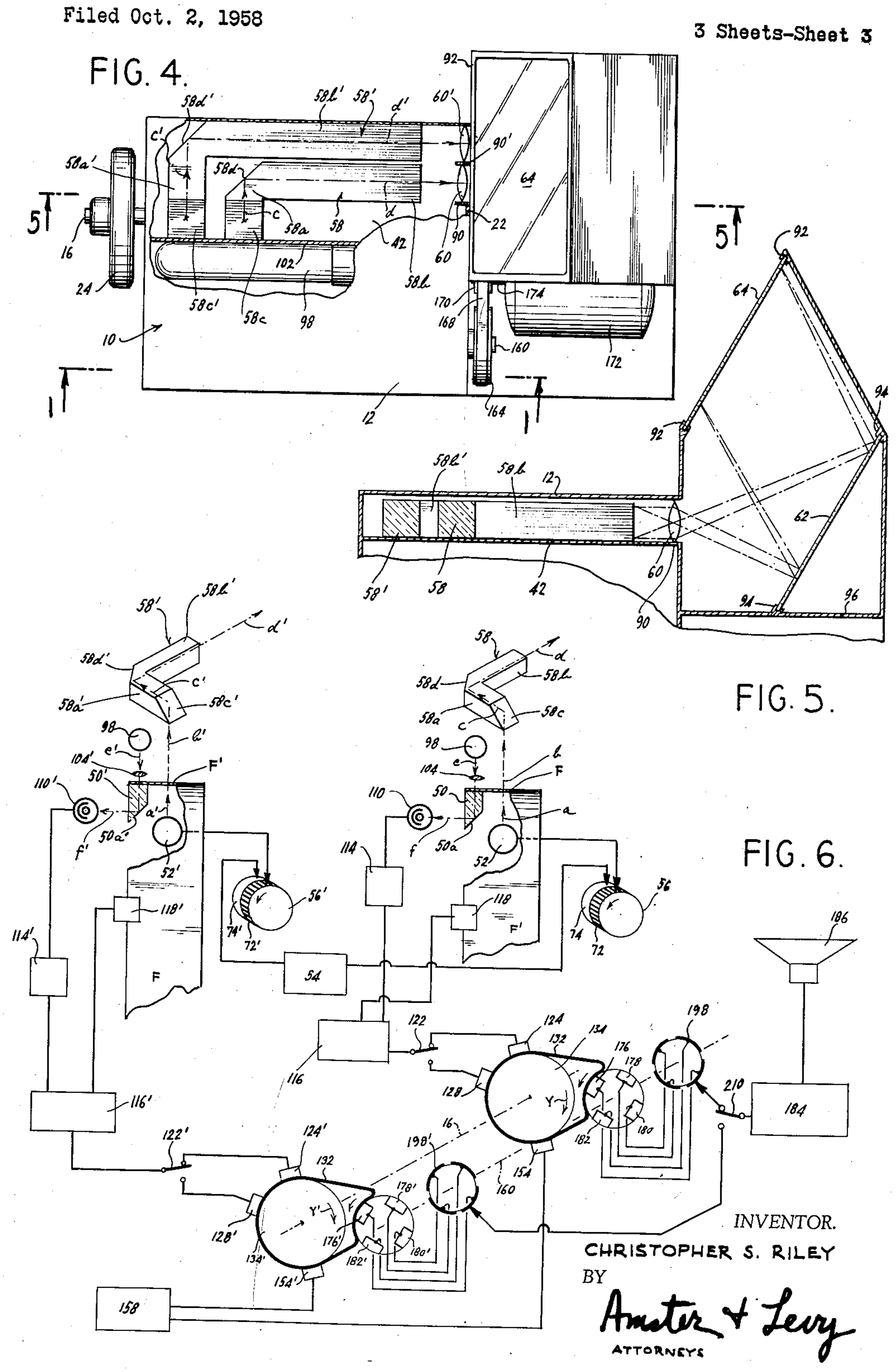
Fig. 4 is a plan view, with parts broken away, of the entire device a portion of which is shown in Fig. 1.
Fig. 5 is a cross-sectional view of a portion of the device of Fig. 4, taken along the lines 5—5 of Fig. 4 looking in the direction of the arrows; and, Fig. 6 is a schematic diagram illustrating the electrical circuitry and the functional relationship between the operating components of the device of Fig. 4.

Referring next primarily to Figs. 1, 2, and 6, it is seen that the dual projection system includes a pair of stroboscopic projection lamps 52 and 52′ to provide the necessary illumination, a power pack 54 to supply power to the projection lamps, a pair of commutator assemblies 56 and 56′ connected between the power pack and the projection lamps to switch the latter on and off in a regular periodic sequence according to the requirements of motion picture projection, and an optical system including prisms 58 and 58′, lenses 60 and 60′, and a mirror 62 and a ground glass viewing screen 64 for simultaneously displaying in juxtaposed relationship successive images corresponding to the successive picture frames of films F and F′. The projection lamps 52 and 52′ are supported by and enclosed within lamp housings 66 and 66′ which are disposed between and spaced from the upper portions of the halves 28 and 30 of reel 14 and of the halves 28′ and 30′ of reel 14′. The lamp housings 66 and 66′ are mounted on brackets 68 and 68′ which are secured at one end to one side wall of housing 12 and at the other end to the other side wall thereof. By virtue of a football-shaped profile the lamp housings 66 and 66′ are enabled to fit just below the arcs of the upper quadrants of reels 14 and 14′ over which the films F and F′ pass. In order to allow successive projection beams of light emanating upwardly from projection lamps 52 and 52′ as indicated by arrows a and a′ of Figs. 2 and 6 to pass through the films F and F′, lamp housings 66 and 66′ are provided with openings 70 and 70′ disposed immediately beneath films F and F′ and of a size and shape to match the individual picture frames thereof. The stroboscopic projection lamps 52 and 52′ are made to flash on once for each successive picture frame of the films F and F′ passing thereover, sending projection beams therethrough, by the commutator assemblies 56 and 56′. The latter include commutator rings 72 and 72′ having alternating conductive and nonconductive areas interspersed about their rims and slip rings 74 and 74′ having continuously conductive rims, the commutator rings 72 and 72′ of each commutator assembly 56 and 56′ being rigidly fastened to and communicating electrically with the slip rings 74 and 74′ of the same commutator assembly 56 and 56′, and the entire ring unit being rigidly mounted on shaft 16 for rotation therewith by set screws 76 and 76′. Rising upwardly from the base of housing 12 are brackets 78 and 78′ to hold brushes 80 and 80′ protruding from insulators 82 and 82′ in position to contact commutator rings 72 and 72′, and brushes 84 and 84′ protruding from insulators 86 and 86′ in position to contact slip rings 74 and 74′. The brushes 80 and 80′ and the brushes 84 and 84′ are connected in the power lines running to stroboscopic projection lamps 52 and 52′ from power pack 54 in such fashion that the gap between the brushes constitutes a break therein which is alternately opened and closed to make the stroboscopic projection lamps 52 and 52′ flash on and off in a regular periodic sequence because of the presentation of the alternating conductive and nonconductive portions of the rim of commutator rings 72 and 72′ to brushes 80 and 80′ as the ring units rotate with shaft 16 in response to the action of films F and F′ on reels 14 and 14′. When the films F and F′ are properly synchronized with each other and with the commutator assemblies 56 and 56′ the latter cause the stroboscopic projection lamps 52 and 52′ to fire at the moment of alignment of each successive picture frame of films F and F′ with stroboscopic lamps 52 and 52′ and openings 70 and 70′ in lamp housings 66 and 66′, in order to project successive images of discrete picture frames as the films F and F′ are run past the openings 70 and 70′. The fact that the speeds of the films F and F′ and of the commutator assemblies 56 and 56′ all depend alike on the speed of the take-up reel driver motor insures the maintenance of such synchronization once established.

Referring next primarily to Figs. 2 and 4–6, it is seen that the successive projection beams, after passing through films F and F′ to be impressed with an image of one of the successive frames thereof, continue upwardly beyond the films as indicated by arrows b and b′ of Figs. 2 and 6 to pass through partition 42 at openings 88 and 88′ therein which are in alignment with projection lamps 52 and 52′ and openings 70 and 70′. They next enter Lucite prisms 58 and 58′ immediately above openings 88 and 88′ which conduct the projection beams to lenses 60 and 60′ provided to bring the images therein to a focus. Prisms 58 and 58′ consist of arms 58a and 58a′ and arms 58b and 58b′ at right angles to each other, the arms 58a′ and 58b′ of prism 58′ being somewhat longer than the arms 58a and 58b of prism 58 in order to enable the two prisms to lie in the same horizontal plane with prism 58 disposed within the angle of prism 58′. The outer ends of arms 58a and 58a′ terminate in 45° slanted reflecting faces 58c and 58c′ which are externally mirror-coated and located directly above openings 88 and 88′ to intercept the vertically rising beams and reflect them into a horizontal path internally of the prisms 58 and 58′ and longitudinally through arms 58a and 58a′ thereof as indicated by arrows *c* and *c′* of Figs. 2, 4, and 6. They are next intercepted by 45° diagonal reflecting faces 58d and 58d′ at the juncture of the prism arms also externally mirror-coated to reflect the beams at a right angle to their previous path internally of the prisms 58 and 58′ and longitudinally through the arms 58b and 58b′ thereof, after which they exit from the prisms 58 and 58′ and travel side by side toward lenses 60 and 60′, as indicated by arrows *d* and *d′* of Figs. 4 and 6. The lenses 60 and 60′ are mounted in openings 90 and 90′ in the partition 22 and, as indicated by the ray diagram, Fig. 5, are of a focal length to focus the images impressed on both projection beams in juxtaposed relationship on the common ground glass viewing screen 64 which is mounted in a frame 92 secured to an opening in the housing 12 and held thereby in a raised position above the remainder of the film reader 10 and at an angle to facilitate viewing, after the beams have first been reflected to the screen 64 by a mirror 62 held at the proper angle to achieve such reflection by a frame 94 secured to the housing 12 and an internal partition 96.

Referring next primarily to Figs. 1, 2, 4, and 6, it is seen that the audio system is adapted to cooperate in order to reproduce sounds in accordance with the sound tracks of films F and F′ with either of two types of sound tracks commonly imprinted on motion picture films, the photographic type or the magnetic type. For cooperating with photographic sound tracks in the event that the sound tracks of either or both of the films F and F′ are of that type, there are provided optical tracking assemblies responsive thereto, which include an elongated exciter lamp 98 mounted on a bracket 100 secured to the partition 42 for continuously illuminating successive points along such sound tracks as the films F and F′ are reeled through the film reader 10. A partition 102 is provided between the prisms 58 and 58′ and the exciter lamp 98 to prevent light from the latter from entering the projection system. Lenses 104 and 104′ held by lens collars 106 and 106′ directly under openings 108 and 108′ in partition 42 both located under the elongated exciter lamp 98 are provided to focus the light therefrom so that it is concentrated on and shines through the photographically imprinted sound tracks on the margins of films F and F′ to be modulated thereby, as indicated by arrows *e* and *e′* of Fig. 6. Annular Lucite prisms 50 and 50′ at the rims of halves 30 and 30′ disposed directly under the photographically imprinted sound tracks have annular 45° beveled reflecting faces 50a and 50a′ externally mirror-coated to reflect the light shining through the photographically imprinted sound tracks internally of the prisms 50 and 50′ and toward photoelectric cells 110 and 110′, as indicated by arrows *f* and *f′* of Fig. 6, which causes cells 110 and 110′ to be activated in accordance with the modulations of the light beams reaching them. The cells 110 and 110′ are held in position to receive the modulated exciter beams by brackets 112 and 112′ secured to one side wall of housing 12, and are operatively connected to transmit signals in accordance with the modulations of the exciter beam to pre-amplifiers 114 and 114′ which put those signals through a first stage of amplification and are in turn connected to amplifiers 116 and 116′ by which the signals are further amplified. For cooperating with magnetic sound tracks in the event that the sound tracks of either or both of the films F and F′ are of that type, there are provided magnetic tracking assemblies including magnetic tracking heads 118 and 118′ responsive thereto which are held near the films F and F′ and in position to respond to the modulations of the magnetically imprinted sound tracks thereof by brackets 120 and 120′ suspended from partition 42, and are operatively connected directly to amplifiers 116 and 116′ to transmit signals in accordance with the modulations of the sound tracks thereto for amplification. Any given film F or F′ will of course have only one type of sound track, so that the optical and magnetic tracking assemblies are alternatives selected by the operator of the film reader 10 according to the type of sound track imprinted on each of the films then being read. For selecting either the magnetic or the optical tracking assemblies for films F and F′ there are provided switches 122 and 122′ respectively.

By convention the portion of the sound track of a motion picture film corresponding to any given picture frame thereof is imprinted upon the film a standard number of frames in advance of that frame. Thus, in order to synchronize sound with picture it would ordinarily be necessary to place the tracking assemblies at a location staggered ahead of the projection lamp by that standard number of frames. In the illustrated embodiment the magnetic tracking heads 118 and 118′ are seen to be staggered somewhat ahead of the projection lamps 52 and 52′, while the photoelectric cells 110 and 110′ of the optical tracking assemblies are also staggered somewhat ahead of the projection lamps 52 and 52′, although not quite so far ahead as are the magnetic tracking heads 118 and 118′. By this means the optical tracking assemblies are brought to within something less than the conventional distance from a synchronized relationship, and the magnetic tracking assemblies are brought even closer, but some synchronization gap still remains as to both of the tracking assemblies. Thus, in order to synchronize picture and sound, the audio system of the film reader 10 is provided with a coordinating device which either magnetically re-records the magnetic sound tracks, in order to store them idly for a brief interval corresponding to the synchronization gap remaining between the magnetic tracking heads 118 and 118′ and the projection lamps 52 and 52′, or else magnetically re-records the photographic sound tracks in order to store them idly for a slightly longer interval corresponding to the somewhat greater synchronization gap remaining between the photoelectric cells 110 and 110′ of the optical tracking assemblies and the projection lamps 52 and 52′.

Figure 3:
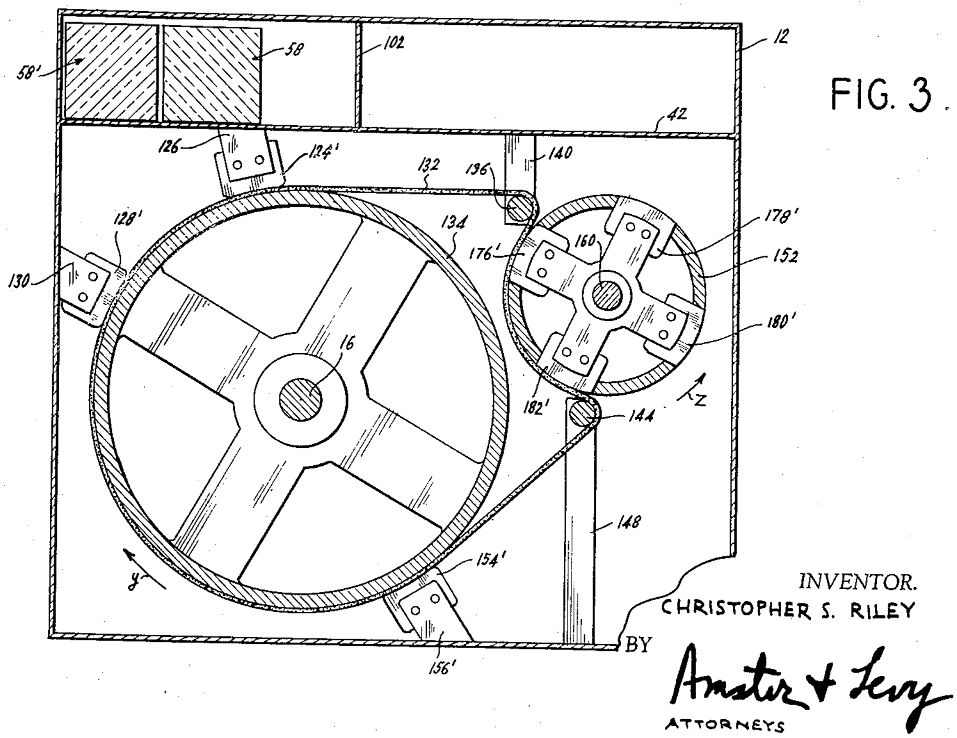
Fig. 3 is another cross-sectional view of the portion of the device of Fig. 1 taken along the lines 3—3 of Figs. 1 and 4 looking in the direction of the arrows.

Referring next primarily to Figs. 1, 3, and 6, it is seen that the coordinating device includes magnetic recording heads 124 and 124′ mounted on brackets 126 and 126′ suspended from partition 42, which heads are connectable by switches 122 and 122′ to amplifiers 116 and 116′ to receive and re-record the signals corresponding to the magnetically imprinted sound tracks which the amplifiers 116 and 116′ receive from magnetic tracking heads 118 and 118′ and subsequently amplify. It further includes magnetic recording heads 128 and 128′ mounted on brackets 130 and 130′ affixed to a side wall of the housing 12, which heads are alternatively connectable by switches 122 and 122′ to amplifiers 116 and 116′ to receive and re-record the signals corresponding to the photographically imprinted sound tracks which the amplifiers 116 and 116′ receive from photoelectric cells 110 and 110′ and pre-amplifiers 114 and 114′ of the optical tracking assemblies and subsequently amplify. For receiving and storing the re-recorded sound tracks there is provided a broad, continuous storage loop 132 made of magnetically sensitive recording tape and provided with a regularly spaced row of sprocket holes 132*a* on each margin. The storage loop 132 is mounted for continuous rotation about three pulleys, including a broad storage drum 134 of the same diameter as reels 14 and 14' which is rigidly mounted on shaft 16 for rotation therewith, an elongated roller 136 rotatably mounted on an axle pin 138 journaled at its ends in brackets 140 and 142 suspended from the partition 42, and another elongated roller 144 rotatably mounted on an axle pin 146 journaled at one end in brackets 148 rising from the base of the housing 12, and at the other end in a bearing stanchion 150 rising upwardly from the base of the housing 12. The storage drum 134 is provided with sprockets 134*a* on both margins to cooperate with the sprocket holes 132*a* of the storage loop 132 for positive engagement of storage loop 132 by the storage drum 134. Thus, as the passage of films F and F' or either one of them through film reader 10 causes the reels 14 and 14' or either one of them to rotate in the direction indicated by arrow *x* of Fig. 2, which in turn causes the shaft 16 to rotate, the storage drum 134 is caused to rotate with the shaft 16 at the same speed and in the same direction as shaft 16. As a result, owing to its sprocketed engagement with storage drum 134, storage loop 132 is continuously reeled in the direction indicated by arrow *y* of Fig. 3, about the loop path defined by storage drum 134 and rollers 136 and 144. The recording heads 124 and 128 are disposed in a common plane perpendicular to shaft 16 and are operatively disposed adjacent to the storage loop 132 so that the recording heads 124 or 128 can re-record the signals corresponding to either a photographic or magnetic sound track of film F on storage loop 132 in a common band extending about the loop path thereof as the storage loop 132 travels past the recording heads 124 and 130. The recording heads 124' and 130' are similarly disposed alongside recording heads 124 and 130 respectively in another plane parallel to the plane of recording heads 124 and 130 so that recording heads 124' or 130' can re-record the signals corresponding to either a photographic or magnetic sound track respectively of film F' on storage loop 132 in a common band extending about the loop path thereof alongside of and parallel to the band employed by recording heads 124 and 130 as the storage loop 132 travels past the recording heads 124' and 128'. For modulating the ultimate output of the audio system there is provided a pickup drum 152 operatively disposed adjacent the storage loop 132 and pressing the latter into a concave arc at a place of mutual contact of pickup drum 152 with the storage loop 132 between the rollers 136 and 144. The pickup drum 152 contains magnetic pickup heads which are responsive to the bands of magnetic impressions recorded on storage loop 132 as the latter travels past the pickup drum 152 and which are operatively connected to the remainder of the audio system as hereinafter described to modulate the ultimate output thereof. The time taken for a given impression after being recorded by one of the recording heads 124, 124', 128, or 128' on the storage loop 132 to travel along the loop path thereof to reach the pickup drum 152 and be fed into the ultimate audio output is the idle storage time, somewhat greater for recording heads 128 and 128' than it is for recording heads 124 and 124', which compensates for the respective remaining synchronization gaps thereof by delaying reproduction of each part of the sound tracks of films F or F' by the ultimate audio output until the corresponding picture frame thereof has arrived at the projection lamps 52 or 52' for projection thereof. The dependence of the travel speed of storage loop 132 on the rotational speed of storage drum 134 and shaft 16, and the dependence of the latter on the rotational speed of reels 14 and 14', which in turn depends on the travel speed of films F and F', plus the fact that reels 14 and 14' and storage drum 134 all have the same diameter so that the equivalence between the travel speed of films F and F' and the rotational speed of reels 14 and 14' is the same as that between the travel speed of storage loop 132 and the rotational speed of storage drum 134, serves to insure that the travel speed of films F and F' past projection lamps 52 and 52', upon which the reading speed of the picture portion depends, will be equal to the travel speed of storage loop 132 past the pickup drum 152, upon which the reading speed of the sound portion depends, in order to preserve the synchronous relationship between sound and picture throughout operation of the film reader 10 and at all operating speeds thereof.

For erasing each part of the bands of magnetic impressions from storage loop 132 after that part has traveled past pickup drum 152 to be fed into the ultimate audio output and before it returns again to the recording heads 124 and 130 or the recording heads 124' and 130', there are provided magnetic erase heads 154 and 154' mounted on brackets 156 and 156' affixed to the base of housing 12 in the respective planes of the recording heads 124 and 130 and the recording heads 124' and 130' and operatively disposed adjacent the storage loop 132 and the respective bands of magnetic impressions recorded thereon and operatively connected to an erase oscillator 158 to cause continuous erasure of the bands as the storage loop 132 travels past the erase heads 154 and 154'.

For rendering the sounds reproduced comprehensible when the dual rotatable assembly is operated at a reading speed different from the recording speed of the sound tracks of films F and F' and the storage loop 132 is consequently caused by storage drum 134 mounted on a common shaft 16 with reels 14 and 14' to travel past pickup drum 152 at the same abnormal speed, the audio system is provided with a speed-compensating device. The latter includes the pickup drum 152 rigidly mounted for rotation therewith on an auxiliary rotatable shaft 160 parallel to the main shaft 16 but rotatable independently thereof. The auxiliary shaft 160 is journaled at one end in a flanged bearing 162 mounted on partition 22 and journaled at the other end in the bearing stanchion 150. On a portion of the shaft 160 which projects through partition 22 there is a drive pulley 164 rigidly affixed thereto for rotation therewith by means of set screw 166, which pulley is driven by a drive belt 168 mounted thereover and driven by a second pulley 170 over which the belt 168 is also mounted. The pulley 170 is driven in turn by a variable speed reversible electric motor 172 via the drive shaft 174 thereof to which the pulley 170 is secured. Thus the motor 172 can be used to rotate shaft 160 and pickup drum 152 at a speed selectable by varying the speed of motor 172, and in a direction selectable by reversal thereof. For responding to the magnetic impressions recorded on storage loop 132 as they travel through the concave arc portion of the loop path thereof between rollers 136 and 144 and past pickup drum 152, the pickup drum is provided with one set of four magnetic pickup heads 176, 178, 180, and 182 spaced evenly about its surface and all lying in the plane of magnetic recording heads 124 and 130 whereby the one of the aforesaid pickup heads which happens to be adjacent the storage loop 132 at the concave arc thereof is thus operatively positioned to respond to the band of impressions corresponding to the sound track of film F recorded on the storage loop 132 by either one of the recording heads 124 or 130. A second set of pickup heads 176', 178', 180', and 182' is similarly disposed in the plane of magnetic recording heads 124' and 130 whereby the one of the aforesaid second set of pickup heads which happens similarly to be within the concavity of storage loop 132 is operatively positioned to respond to the band of impressions corresponding to the sound track of film F′ recorded on the storage loop 132 by either one of the recording heads 124′ or 130′. By rotating pickup drum 152 any one pickup head out of each set thereof can be brought into the operative position within the concavity of storage loop 132 to respond to the magnetic impressions thereon as they travel past. A commutator assembly is provided for always keeping the particularly pickup head of each set which at any given moment is thus positioned to respond to the storage loop 132 operatively connected to modulate a final amplifier 184 and a speaker or earphone 186 operatively connected thereto to provide the ultimate output of the audio system of film reader 10. The commutator assembly includes a slip ring 188 with a continuously conductive surface rigidly mounted on shaft 160 for rotation therewith by a set screw 190. Slip ring 188 is electrically connected to a first side of each of the pickup heads of pickup drum 152, and is contacted by a brush 192 protruding from insulator 194 and supported by a bracket 196 affixed to the bearing stanchion 150, which brush is connected to a first side of the input of amplifier 184 to provide a continuously connected common return line thereto for all the pickup heads of pickup drum 152. Individual connections for the second side of each of the pickup heads of pickup drum 152 are provided by four-part commutator rings 198 and 198′ rigidly mounted on shaft 160 for rotation therewith by set screws 200 and 200′. Each of the four quadrantal segments spaced about the rim of commutator ring 198 is connected to the second side of a different one of the first set of pickup heads 176, 178, 180, and 182 of pickup drum 152 and each of the four quadrantal segments spaced about the rim of commutator ring 198′ is connected to the second side of a different one of the second set of pickup heads 176′, 178′, 180′, and 182′, in such sequence that the particular quadrantal segments disposed at the bottom of commutator rings 198 and 198′ are always the ones which are connected to the particular pickup heads of the aforesaid first and second sets which are positioned to respond to the storage loop 132 at any given moment during rotation of shaft 160. The fact that the commutator rings 198 and 198′ and pickup drum 152 containing the pickup heads are all mounted on a common shaft 160 for rotation at the same speed and in the same direction insures the maintenance of that sequential relationship during rotation of the shaft 160 at any speed and in either direction. Brushes 202 and 202′, which are disposed directly below the four-part commutator rings 198 and 198′ and which protrude from insulators 204 and 204′ mounted on a common base 206 affixed to a bracket 208 which is secured to the partition 22 to always contact the lowermost quadrantal segments of commutator rings 198 and 198′, are connected to the alternative poles of a switch 210 which either connects brush 202 to the second side of the input of amplifier 184 to allow the pickup heads 176, 178, 180, and 182 of the first set to modulate the audio output in accordance with the sound track of film F, or else connects brush 202′ thereto to allow the pickup heads 176′, 178′, 180′, and 182′ of the second set to moluate the audio output in accordance with the sound track of film F′. Thus, during operation of the film reader 10 the operator listens either to the sound track of film F or alternatively to that of film F′, and can switch back and forth between them as desired by means of switch 210.

The speed at which the films F and F′ travel past the projection lamps 52 and 52′ determines the reading speed at which the picture portion of the films F and F′ are projected, while the speed at which the storage loop 132 travels past pickup drum 152 determines the reading speed at which the sound tracks thereof are reproduced. In order to preserve synchronization between sound and picture throughout operation of the film reader 10 and at all operating speeds thereof, the reading speeds of the picture and sound portions must be the same. Thus, when the films F and F′ are run at an abnormal reading speed the storage loop 132 is also made to travel at the same abnormal reading speed, as it must in order to preserve the synchronization of sound with picture. Thus the storage loop 132 is made to travel past the pickup drum 152 at a speed different from the recording speed at which the sound tracks of films F and F′ were originally imprinted thereon. This difference between the reading speed and the recording speed of the sound track would ordinarily result in garbling and distorting the sounds reproduced. In order to compensate for this difference in speed, pickup drum 152 is made to perform whatever motion is required to make the pickup heads mounted thereon move in such fashion that the relative speed at which the storage loop 132 travels past the particular pickup heads of pickup drum 152 which at any moment are operatively positioned adjacent thereto equal to the recording speed of the sound tracks of films F and F′. Thus, if the films F and F′ are run at some abnormally fast reading speed and the storage loop 132 is consequently required to travel at the same abnormally fast speed about its loop path in the direction indicated by arrow *y* of Fig. 3, then the motor 172 is made to rotate pickup drum 152 in the direction indicated by the arrow *z* of Fig. 3 so that the pickup heads of pickup drum 152 and the storage loop 132 move through their arc of mutual contact in the same direction, as a result of which the travel speed of the storage loop 132 relative to the pickup heads of pickup drum 152 as they come into operative position adjacent the storage loop 132 is reduced; and conversely if the films F and F′ are run at some abnormally slow reading speed at the storage loop 132 is consequently required to travel at the same abnormally slow speed about its loop path in the direction indicated by arrow *y* of Fig. 3, then the motor 172 is reversed and thereby made to rotate pickup drum 152 in the direction opposite to that indicated by arrow *z* of Fig. 3 so that the pickup heads of pickup drum 152 and the storage loop 132 move through their arc of mutual contact in opposite directions, as a result of which the travel speed of the storage loop 132 relative to the pickup heads of pickup drum 152 as they come into operative position adjacent the storage loop 132 is increased; the rotational speed of pickup drum 152 in either case being chosen by the operator at whatever level is required to render the sound comprehensible at the particular reading speed then in effect. The pickup heads of pickup drum 152, as a result of the revolving motion thereof necessary to change the travel speed of the storage loop relative thereto, will continuously revolve out of the operative position adjacent the concavity of the storage loop 152 and will continuously replace each other at that position in a revolving sequence, the commutator assembly of shaft 160 insuring that the particular pickup heads which are in that position at each moment are also connected to the switch 210 leading to the audio output. Thus, as the content of any sound track is reproduced it is reorganized by being chopped up into successive segments read by successive pickup heads in their revolving sequential order. Despite the abnormal speed at which the sound track as a whole is read, each individual segment is read at a normal speed by one of the pickup heads moving at the proper relative speed. In the case of abnormally fast reading, these segments will constitute spaced apart portions of the content of the sound track, the remaining portions between such segments being discarded and not reproduced at all. This process is called sound compression. Conversely, in the case of abnormally slow reading, these segments will constitute overlapping portions of the content of the sound track, the overlapping areas being repeated during reproduction. This process is called sound expansion. Alternatively, the films F and F′ can also be read at a normal reading speed equal to the recording speed of the sound tracks thereof. In the latter case neither compression nor expansion is necessary, since the storage loop 132 will already be traveling past the pickup drum 152 at a speed equal to the recording speed of the sound track. Consequently, pickup drum may be allowed to remain stationary, with one pickup head of each set thereof remaining constantly in operative position adjacent the concavity of storage loop 132, so that no reorganization or chopping into segments takes place.

It will now be appreciated that an illustrative method of simultaneously reading and comparing two motion picture films F and F′ at a reading speed different from the recording speed of the sound tracks thereof includes the steps of displaying in juxtaposed relationship images in accordance with both motion picture films F and F′, reproducing sounds in accordance with a sound track thereof, synchronizing the sounds reproduced with the images displayed by delaying reproduction of the sounds, and reorganizing the sounds in the course of reproduction thereof to compensate for the difference between the reading speed and the recording speed of the sound tracks such that the sounds are rendered comprehensible, by compressing the sounds in order to read the films at a reading speed in excess of the recording speed of the sound tracks thereof, or expanding the sounds in order to read them at a reading speed less than the recording speed of the sound tracks.

Thus, the present invention provides a method and an apparatus by means of which one film can be read, or two films simultaneously read and compared, either at very high speeds for editing or other purposes, or, if desired, at normal or lower than normal speeds, and the sound track of either of the films being read can be selected by the reader, regardless of whether it be photographically or magnetically imprinted, for reproduction in a manner which will be comprehensible at all reading speeds.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. A device adapted for reading a motion picture film bearing images and having a sound track recorded thereon at a recording speed selected to synchronize said sound track with said images comprising a film-reading mechanism operable at a reading speed different from the recording speed of the sound track including means for displaying images in accordance with the motion picture film, means for reproducing sounds in accordance with the sound track thereof, and means responsive to the sound-reproducing means for rendering the sounds reproduced comprehensible when said film-reading mechanism is operated at a reading speed different from the recording speed of the sound track.

2. A device adapted for reading a motion picture film bearing images and having a sound track recorded thereon at a recording speed selected to synchronize said sound track with said images comprising film-reading mechanism operable at a reading speed selectable from a range of speeds including means for displaying images in accordance with the motion picture film, means for reproducing sounds in accordance with the sound track thereof, and means responsive to the sound-reproducing means for rendering the sounds reproduced comprehensible when said film-reading mechanism is operated at a reading speed different from the recording speed of the sound track.

3. A device for rapid reading of a motion picture film having images and a sound track recorded in synchronism thereon comprising a film-reading mechanism operable at a reading speed which is faster than the normal recording speed of said film and including film-viewing means for displaying images in accordance with said film and sound-compression means for reproducing said sound track comprehensibly at said faster reading speed.

4. A device adapted for reading a motion picture film bearing images and having a sound track recorded thereon at a recording speed selected to synchronize said sound track with said images comprising a film-reading mechanism operable at a reading speed selectable from a range of speeds extending above the recording speed of the sound track including means for displaying images in accordance with the motion picture film, means for reproducing sounds in accordance with the sound track thereof, and means responsive to the sound-reproducing means and adapted for sound-compression to render the sounds reproduced comprehensible when said film-reading mechanism is operated at a reading speed in excess of the recording speed of the sound track.

5. A device adapted for reading a motion picture film bearing images and having a sound track recorded thereon at a recording speed selected to synchronize said sound track with said images comprising rotatable means operable for passing the motion picture film operatively through said device at a reading speed higher than the recording speed of the sound track, a projection system for displaying images in accordance with the film, and an audio system for reproducing sounds in accordance with the sound track thereof, said audio system including sound-compression means for rendering the sounds reproduced comprehensible when the film is passed operatively through said device at a reading speed higher than the recording speed of the sound track.

6. A device adapted for simultaneously reading and comparing two motion picture films each bearing images and having a sound track recorded thereon at a recording speed selected to synchronize said sound track with the images thereof comprising dual rotatable means operable for simultaneously passing both motion picture films operatively through said device at a reading speed higher than the recording speed of the sound tracks, a dual projection system for simultaneously displaying in juxtaposed relationship images in accordance with both motion picture films, and an audio system for reproducing sounds in accordance with a sound track thereof, said audio system comprising sound compression means for rendering the sounds reproduced comprehensible when the films are passed operatively through said device at a reading speed higher than the recording speed of the sound tracks.

7. A device adapted for simultaneously reading and comparing two motion picture films each bearing images and having a sound track recorded thereon at a recording speed selected to synchronize said sound track with the images thereof comprising dual rotatable means operable at a reading speed different from the recording speed of the sound tracks for simultaneously passing both motion picture films operatively through said device, a dual projection system for simultaneously displaying in juxtaposed relationship images in accordance with both motion picture films, and an audio system responsive to either of the motion picture films for reproducing sounds in accordance with a sound track thereof, said audio system comprising magnetic tracking means responsive to magnetically imprinted sound tracks, optical tracking means responsive to photographically imprinted sound tracks, coordinating means for synchronizing the sounds reproduced with the images projected, and sound-compression means for rendering the sounds reproduced comprehensible when said dual rotatable means are operated at a reading speed higher than the recording speed of the sound tracks.

8. A device for simultaneously reading a first motion picture film and reproducing sounds from a sound track recorded upon a second motion picture film at a recording speed selected to synchronize said sound track with said first motion picture film, said device comprising a film-reading mechanism operable at a reading speed different from said recording speed including means for displaying images in accordance with said first motion picture film, means for synchronizing said second motion picture film with said first motion picture film, and a sound-reproducing system operable at said reading speed including means for simultaneously reproducing sounds in accordance with said sound track and means responsive to said reproducing means for rendering the sounds reproduced thereby comprehensible when said reading speed is different from said recording speed.

References Cited in the file of this patent

UNITED STATES PATENTS

| | | |
|---|---|---|
| 1,865,028 | Mallina | June 28, 1932 |
| 2,170,751 | Gabrilovitch | Aug. 22, 1939 |
| 2,528,699 | Masterson | Nov. 7, 1950 |
| 2,813,453 | Browder | Nov. 19, 1957 |

FOREIGN PATENTS

| | | |
|---|---|---|
| 732,370 | Great Britain | June 22, 1955 |